(12) United States Patent
Halpern

(10) Patent No.: US 7,694,989 B2
(45) Date of Patent: Apr. 13, 2010

(54) LATERAL STABILIZER FOR MOTORCYCLE

(76) Inventor: Richard Halpern, 23 Maplemoor La., White Plains, NY (US) 10605

(*) Notice: Subject to any disclaimer, the term of this patent is extended or adjusted under 35 U.S.C. 154(b) by 26 days.

(21) Appl. No.: 12/101,030

(22) Filed: Apr. 10, 2008

(65) Prior Publication Data
US 2008/0258448 A1 Oct. 23, 2008

Related U.S. Application Data

(62) Division of application No. 11/407,022, filed on Apr. 19, 2006, now Pat. No. 7,384,055.

(60) Provisional application No. 60/672,234, filed on Apr. 18, 2005.

(51) Int. Cl.
*B62H 7/00* (2006.01)
*B60R 21/00* (2006.01)

(52) U.S. Cl. ................ 280/293; 280/755

(58) Field of Classification Search ........... 280/293, 280/755, 730.1; 180/116–130
See application file for complete search history.

(56) References Cited

U.S. PATENT DOCUMENTS

| 4,658,732 | A | * | 4/1987 | Coester | 104/156 |
| 5,118,126 | A | * | 6/1992 | Yaple | 280/293 |
| 5,358,265 | A | * | 10/1994 | Yaple | 280/293 |
| 5,377,775 | A | * | 1/1995 | Rush | 180/116 |
| 5,518,259 | A | * | 5/1996 | Hall | 280/43.2 |
| 2005/0167961 | A1 | * | 8/2005 | Murata et al. | 280/755 |

* cited by examiner

*Primary Examiner*—Lesley D Morris
*Assistant Examiner*—Marc A Scharich
(74) *Attorney, Agent, or Firm*—Kelleher IP, PLLC; Sean Liam Kelleher

(57) ABSTRACT

An air propulsion device for laterally stabilizing a motorcycle in an upright position when stopped. The device includes a substantially rectangular shaped plate having a top, bottom, first and second opposing sides. A pair of brackets are mounted to the first and second sides of the plate for attaching the device to the motorcycle. An air-flow generator unit is integrally attached to the top of the plate for generating and controlling pneumatic pressure within the air propulsion device, and has a first and second hose attached thereto. A skirting is integrally attached to the bottom of the plate for inflating and deflating.

3 Claims, 5 Drawing Sheets

LATERAL STABILIZER FOR MOTORCYCLE

CROSS-REFERENCE TO RELATED APPLICATION

This application is a divisional application of allowed application Ser. No. 11/407,022, filed Apr. 19, 2006 now U.S. Pat. No. 7,384,055, and also claims benefit under 35 U.S.C. § 119(e) of United States of provisional patent application No. 60/672,234 filed on Apr. 18, 2005.

BACKGROUND OF THE INVENTION

1. Field of the Invention

The invention relates to stabilizing mechanisms for two wheeled vehicles, and more particularly, to an air propulsion device for laterally stabilizing a motorcycle in an upright position when stopped.

2. Summary of the Related Art

Traditionally, motorcycles have been laterally stabilized by a kick-stand for parking or storage, and by the rider's feet when momentarily stopping at a traffic light or stop sign. In the case of riders with shorter legs, using their feet to stabilize the motorcycle while stopped briefly may be a difficult task. Motorcycles today tend to be well over 300 pounds and a short legged rider may not be able to stabilize a heavy motorcycle with one foot on the ground while leaning considerably to one side. Alternatively, riders with shorter legs can dangle their legs off the sides of the motorcycle and hope to keep it stable and in the upright position by purely balancing on the two tires.

U.S. Pat. No. 5,118,126 to Yapie discloses a hydraulically, pneumatically, electrically, or engine operated motorcycle stand that makes contact with the ground and raises the rear end of the motorcycle off the ground.

U.S. Pat. No. 5,518,259 to Hall discloses a lateral stabilizer for two-wheeled vehicles that includes a pair of outrigger wheels on either side of the rear wheel that are vertically movable as to make contact with the ground when stabilization is needed.

U.S. Pat. No. 5,358,265 to Yaple discloses an automatically actuated motorcycle center lift stand that extends and retracts between a ground contact position and a raised position.

U.S. Pat. No. 4,658,732 to Coester discloses a pneumatic propulsion system for freight and/or passenger vehicles.

While these units may be suitable for the particular purpose employed, or for general use, they would not be as suitable for the purposes of the present invention as disclosed hereafter.

SUMMARY OF THE INVENTION

It is an object of the invention to provide a means for stabilizing a motorcycle without the aid of the rider. Accordingly, the present invention is an air propulsion device that automatically stabilizes a motorcycle in an upright position when the motorcycle comes to a stop, without the need for the rider to engage any mechanism.

It is another object of the invention to provide shorter legged motorcycle riders with a greater sense of stability. Accordingly, the inflated skirting of the present invention creates downward and lateral forces that stabilize the motorcycle in an upright position allowing a rider to not have to drastically lean to one side to place a foot on the ground for fear of falling over.

It is another object of the invention to provide motorcycle riders with a less physically enduring riding experience. Accordingly, the air propulsion device allows a rider to not have to expend energy while trying to hold up a heavy bike at every traffic light and stop sign.

This invention is an air propulsion device for laterally stabilizing a motorcycle in an upright position when stopped. The device includes a substantially rectangular shaped plate having a top, bottom, first and second opposing sides. A pair of brackets are mounted to the first and second sides of the plate for attaching said device to the motorcycle. An air-flow generator unit is integrally attached to the top of the plate for generating and controlling pneumatic pressure within the air propulsion device, and has a first and second hose attached thereto. A skirting is integrally attached to the bottom of the plate for inflating and deflating.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
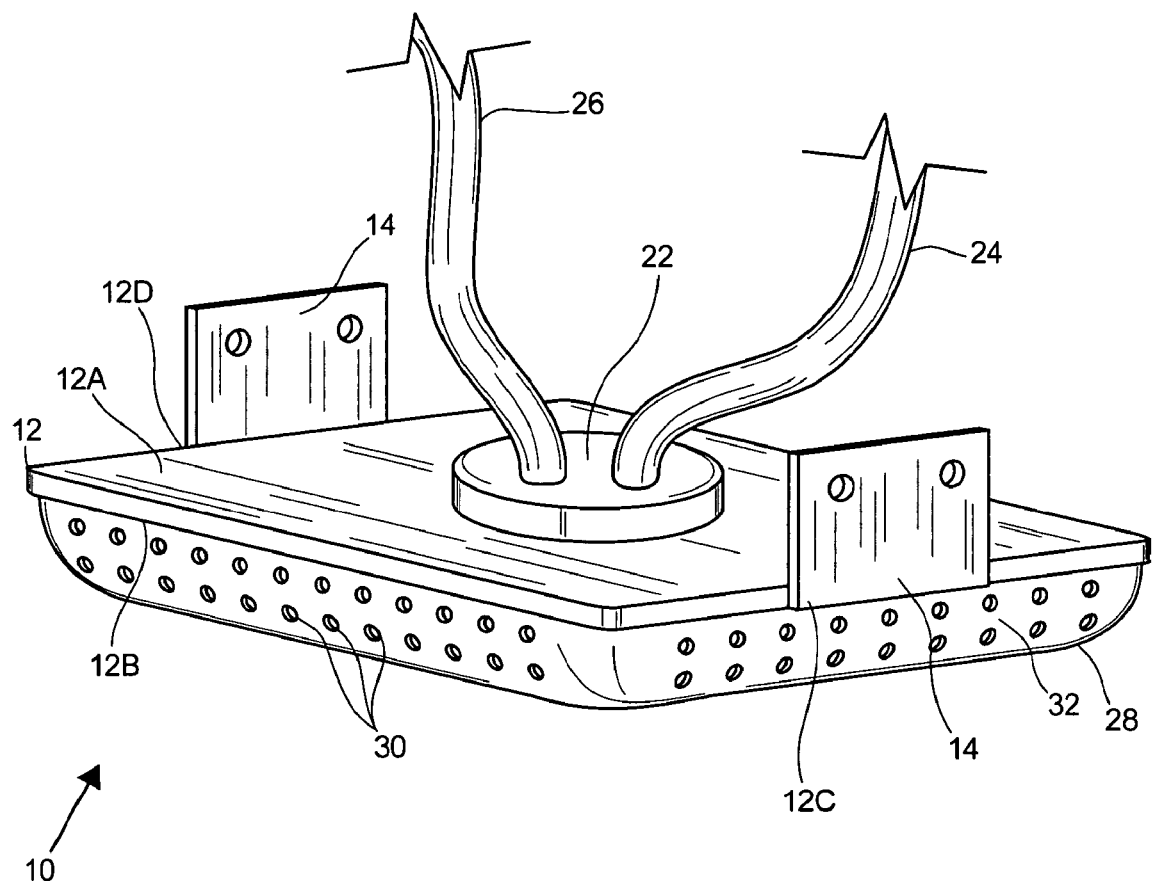
FIG. 1 is a diagrammatic perspective view of an air propulsion device of the present invention for laterally stabilizing a motorcycle in an upright position when stopped.

FIG. 1 illustrates an air propulsion device 10 for laterally stabilizing a motorcycle in an upright position when stopped. The air propulsion device 10 includes a substantially rectangular shaped plate 12 which has a top 12A, a bottom 12B, a first side 12C, and a second side 12D, wherein the first and second sides 12C and 12D are opposing one another. A pair of brackets 14 are mounted to the first side 12C and second side 12D of plate 12 for attachment of the air propulsion device 10 to the motorcycle. Preferably the motorcycle has an underside where the brackets 14 are mounted thereto.

An air-flow generator unit 22 is integrally attached to the top 12A of plate 12 for generating and controlling pneumatic pressure within the air propulsion device 10. The air-flow generator unit 22 allows for multiple connections to air sources. Preferably, air sources for the air propulsion device 10 are from the engine and exhaust system of the motorcycle. A first hose 24 connects the air-flow generator unit 22 with an engine of the motorcycle to supply air to the air propulsion device 10 when the motorcycle 11 is decelerating. Similarly, a second hose 26 connects the air-flow generator unit 22 with an exhaust system of the motorcycle, which removes air from said air propulsion device 10 as the motorcycle 11 is accelerating.

Preferably, the air-flow generator unit 22 has a plurality of control valves, a pneumatic cylinder linked to a command lever that rotates the valve's throttle plate. Air pressure for the cylinder is supplied by an air compressor and controlled by an electropneumatic valve. An electronic module of logic circuits selects the proper position of each of the control valves in accordance with the position of the motorcycle 11. The generator unit 22 operates automatically by logic circuits controlled by an output module of a control microprocessor, which actuates the valves when the motorcycling is slowing down to cause pneumatic propulsion to inflate the skirting 28 for stabilizing the motorcycle 11. When the motorcycle 11 accelerates, the control microprocessor actuates an air shutdown valve and the skirting 28 is deflated. Therefore, the valves regulate the propulsion air.

A skirting 28, preferably rubber, is integrally attached to the bottom 12B of plate 12. The skirting 28 inflates with first hose 24, channeling air from the engine, and deflates with second hose 26, channeling air into the exhaust. The skirting 28 has small venting holes 30 throughout the surface 32. To deflate the skirting 28 more quickly, the holes 30 allow air to escape from the skirting 28 resulting in air pressurization in the immediate vicinity of the surface 32 of the skirting 28.

Figure 2:
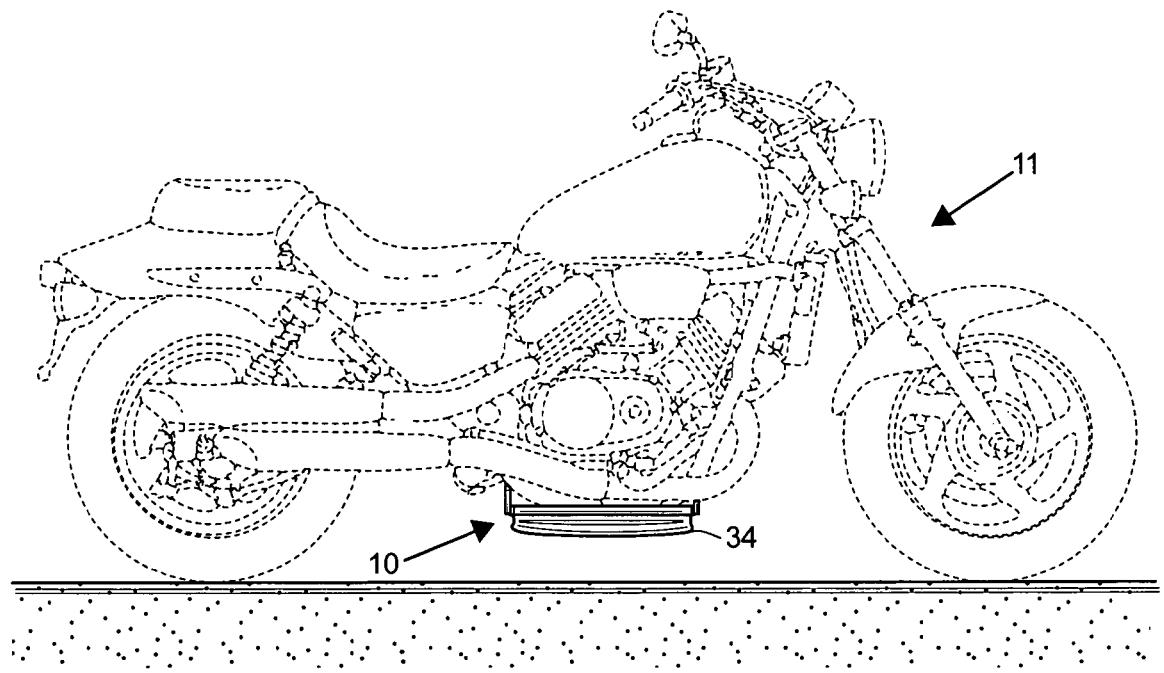
FIG. 2 is a side perspective view of a motorcycle with the air propulsion device of the present invention attached thereto in a non-inflated state.

FIG. 2 illustrates a side view of a motorcycle 11 with the air propulsion device 10 attached thereto in a non-inflated state 34. The non-inflated state 34 allows for ground and tire clearance when the motorcycle 11 is in motion.

Figure 3:
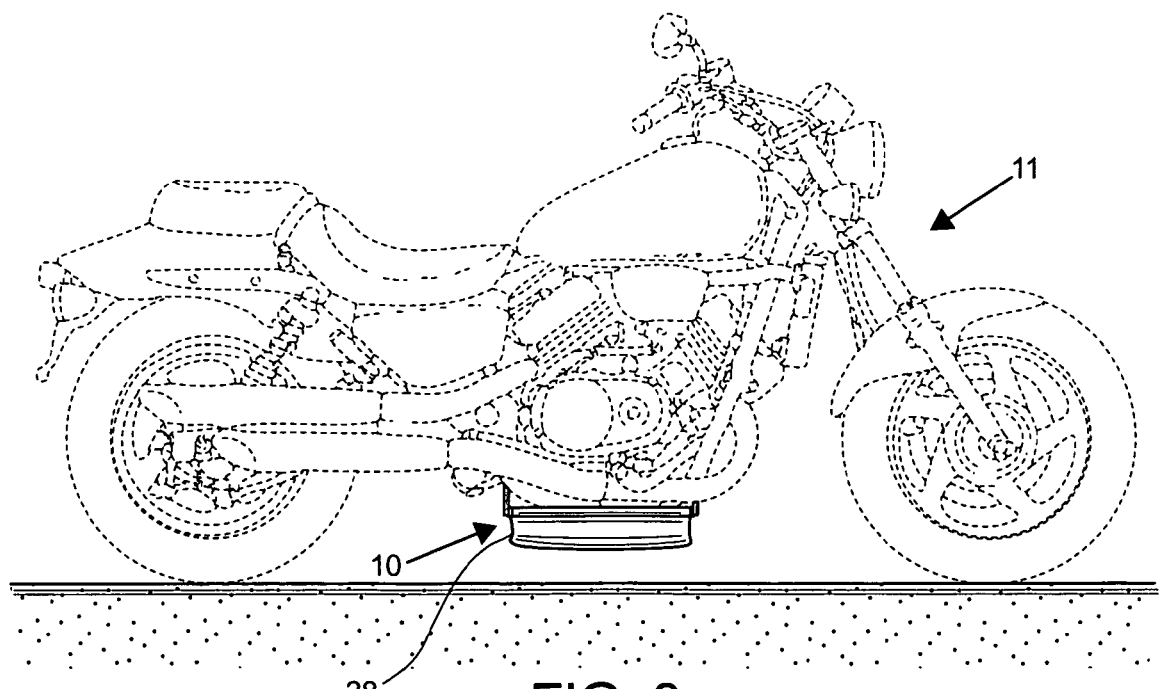
FIG. 3 is a diagrammatic side view of the motorcycle with the air propulsion device of the present invention attached thereto transitioning from a non-inflated state to an inflated state.

FIG. 3 illustrates a side view of a motorcycle 11 as is decelerates with the air propulsion device 10 attached thereto. The air propulsion device 10 is transitioning from a non-inflated state 34, shown in FIG. 2, to an inflated state 36, shown in FIG. 4, using the air-flow generator unit 22, shown in FIG. 1, and air from the engine. Alternatively, air may be supplied by an air blower and a motor, controlled by valves for providing air for pneumatic propulsion of the motorcycle 11. In this alternate embodiment, the air-flow generator unit 22, or alternately a centrifugal blower or any other air-flow generator unit is moved by an electric motor through a shaft and coupling. A second motor can also be connected to the electric motor through coupling and the air-flow generator unit 22 may be actuated by either motor.

The non-inflated state 34 is utilized by a rider when the motorcycle 11 is in motion. As the air propulsion device 10 inflates, the skirting 28 inflates by air hose and begins to expand.

Figure 4:
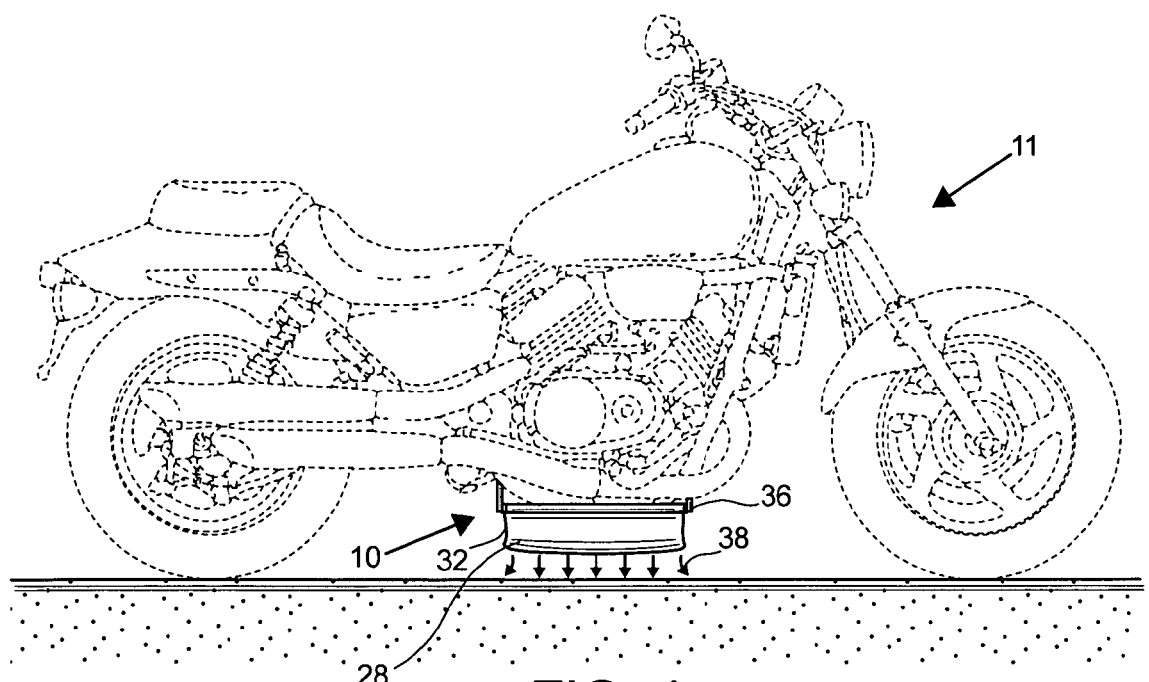
FIG. 4 is a diagrammatic side view of the motorcycle with the air propulsion device of the present invention attached thereto in an inflated state.

FIG. 4 illustrates a side view of a motorcycle 11 in a stopped position with the air propulsion device 10 attached thereto in an inflated state 36. The inflated state 36 laterally stabilizes the motorcycle 11 in an upright position replacing the need for a kickstand or for the rider to place their feet on the ground. There is a thin layer of air 38 between the ground and the inflated surface 32 of the skirting 28. The air 38 creates a downward and lateral force that stabilizes the motorcycle 11 in the upright position.

Figure 5:
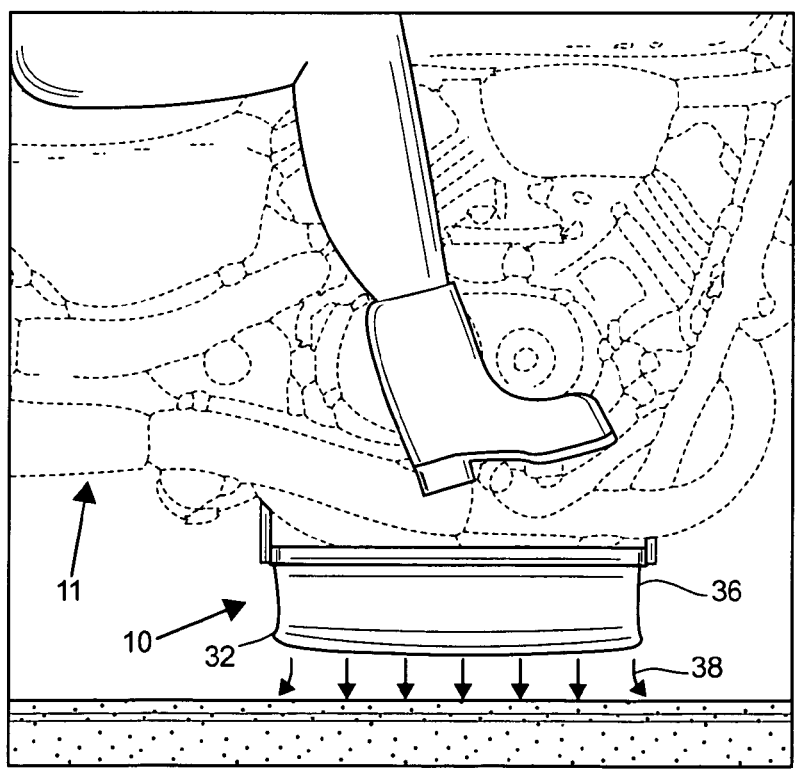
FIG. 5 is a diagrammatic rear view of a rider on the motorcycle with the air propulsion device of the present invention attached thereto in an inflated state.

FIG. 5 illustrates a rear view of a rider on a motorcycle 11 in a stopped position with the air propulsion device 10 attached thereto in the inflated state 36. The inflated state 36 laterally stabilizes the motorcycle 11 in an upright position allowing the rider to remain in the seated position with both feet on the pedals as shown.

Figure 6A:
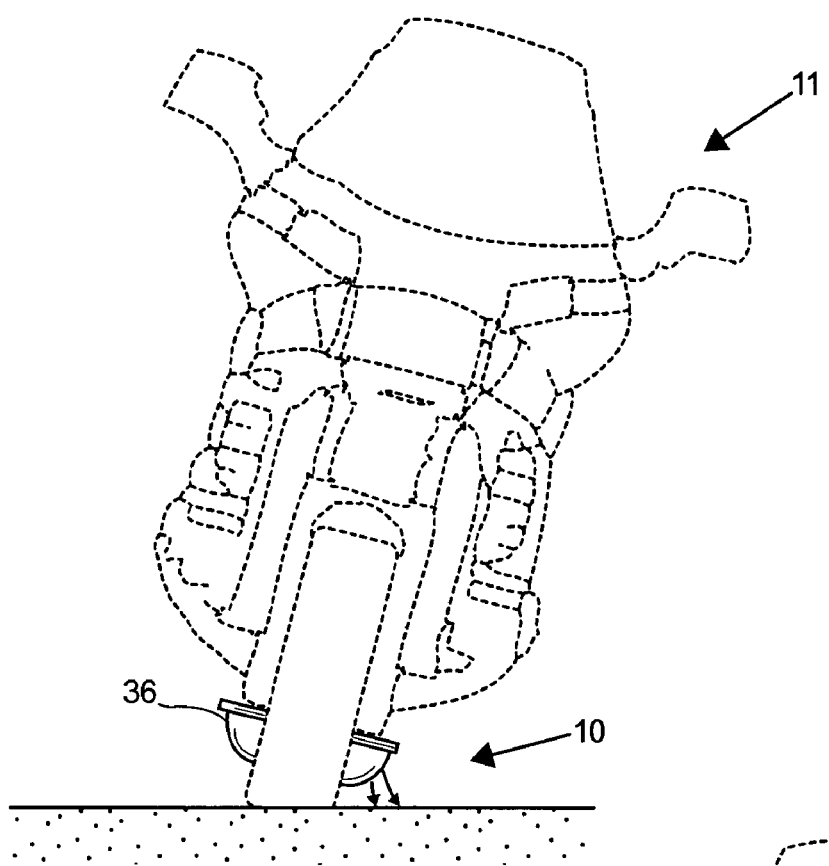
FIGS. 6A, 6B, and 6C are diagrammatic rear views of the motorcycle with the air propulsion device of the present invention attached thereto in use in an inflated state, wherein the air propulsion device compensates to provide stability when the motorcycle is leaning to the right, not leaning, and leaning to the left, respectively.
Figure 6B:
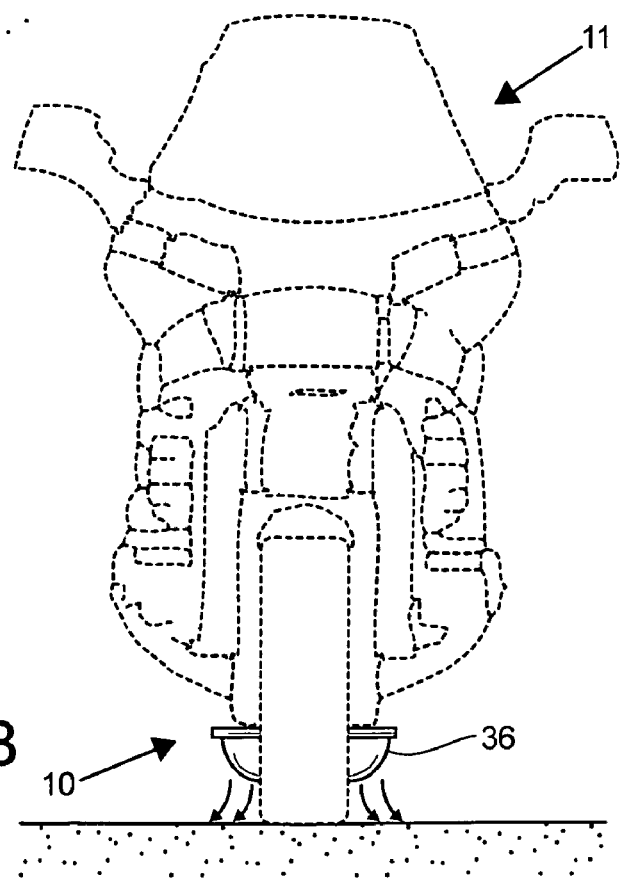
Figure 6C:
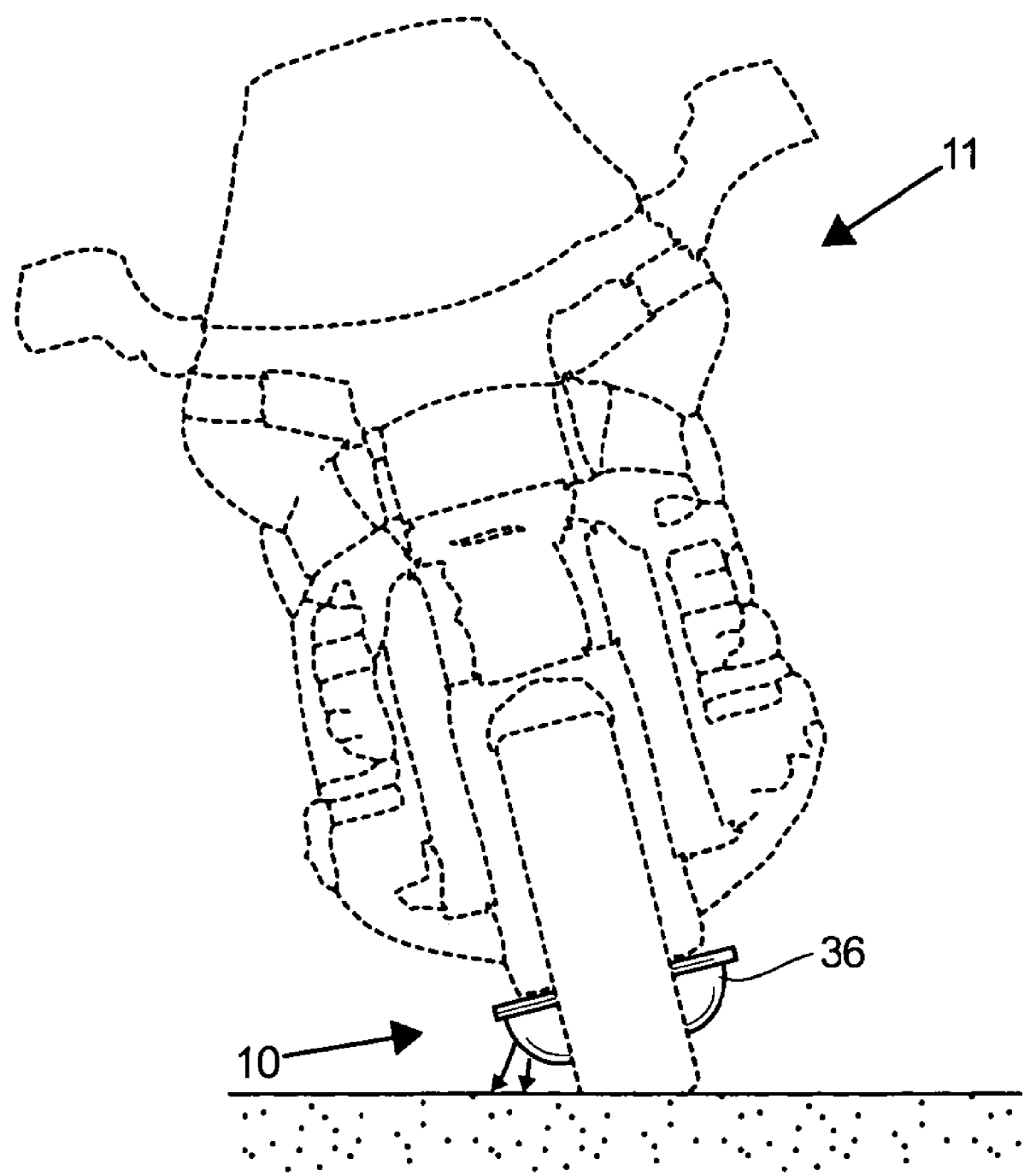

FIGS. 6A, 6B and 6C illustrate a rear view of a motorcycle 11 in the stopped position compensating to provide stability when the motorcycle 11 is leaning to the right, shown in 6A, not leaning, shown in 6B, and leaning to the left, shown in 6C. In FIG. 6A the air propulsion device 10 is in an inflated state 36 with a greater air force discharging on the right side of the motorcycle 11 to stabilize said motorcycle 11 in an upright position. In FIG. 6C the air propulsion device 10 is in an inflated state 36 with a greater air force discharging on the left side of the motorcycle 11 to stabilize said motorcycle 11 in an upright position. In FIG. 6B the air propulsion device 10 is in an inflated state 36 with equal air force discharging on both the left and right-hand sides to stabilize the motorcycle 11 in an upright position.

In conclusion, herein is presented an air propulsion device for laterally stabilizing a motorcycle in an upright position when stopped.

The invention is illustrated by example in the drawing figures, and throughout the written description. It should be understood that numerous variations are possible, while adhering to the inventive concept. Such variations are contemplated as being a part of the present invention.

What is claimed is:

1. An air propulsion device for laterally stabilizing a motorcycle in an upright position when stopped, comprising:
    a substantially rectangular shaped plate having a top, bottom, first and second opposing sides;
    a pair of brackets mounted to the first and second sides of the plate for attaching said device to the motorcycle;
    air-flow generator unit integrally attached to the top of the plate for generating and controlling pneumatic pressure within the air propulsion device, having a first and second hose attached thereto; and
    a skirting integrally attached to the bottom of the plate for inflating and deflating.

2. An air propulsion device for laterally stabilizing a motorcycle in an upright position when stopped, comprising:
    a substantially rectangular shaped plate having a top, bottom, first and second opposing sides:
    a pair of brackets mounted to the first and second sides of the plate for attaching said device to the motorcycle: and
    air-flow generator unit integrally attached to the top of the plate for generating and controlling pneumatic pressure within the air propulsion device, having a first and second hose attached thereto.

3. The air propulsion device of claim 2, further comprising a skirting integrally attached to the bottom of the plate for inflating and deflating.

\* \* \* \* \*